United States Patent
Lee et al.

(10) Patent No.: US 10,389,891 B2
(45) Date of Patent: Aug. 20, 2019

(54) SCANNING APPARATUS, MOBILE APPARATUS, AND SCAN JOB PERFORMING METHOD THEREOF

(75) Inventors: Hak-ju Lee, Suwon-si (KR); Jung-mo Hong, Suwon-si (KR); Dong-hoan Koo, Suwon-si (KR)

(73) Assignee: HP PRINTING KOREA CO., LTD., Suwon-si (KR)

( * ) Notice: Subject to any disclaimer, the term of this patent is extended or adjusted under 35 U.S.C. 154(b) by 825 days.

(21) Appl. No.: 13/225,620

(22) Filed: Sep. 6, 2011

(65) Prior Publication Data

US 2012/0140267 A1 Jun. 7, 2012

(30) Foreign Application Priority Data

Dec. 3, 2010 (KR) .................. 10-2010-0122562

(51) Int. Cl.
*H04N 1/00* (2006.01)
*H04W 4/02* (2018.01)
(Continued)

(52) U.S. Cl.
CPC ..... *H04N 1/00225* (2013.01); *H04N 1/00307* (2013.01); *H04N 1/00* (2013.01);
(Continued)

(58) Field of Classification Search
CPC ........... H04N 1/00225; H04N 1/00307; H04N 1/00228; H04N 2201/0041;
(Continued)

(56) References Cited

U.S. PATENT DOCUMENTS 6,072,595 A * 6/2000 Yoshiura ............ H04N 1/00307
358/400
7,283,274 B2 * 10/2007 Sharma ................ A01H 5/0222
358/1.18
(Continued)

FOREIGN PATENT DOCUMENTS

EP 0830000 3/1998
EP 1610540 A1 * 12/2005
(Continued)

OTHER PUBLICATIONS

European search report dated May 7, 2012 in EP Patent Application No. 11191684.7.
(Continued)

*Primary Examiner* — Benny Q Tieu
*Assistant Examiner* — Juan M Guillermety
(74) *Attorney, Agent, or Firm* — Staas & Halsey LLP

(57) ABSTRACT

Disclosed are a scanning apparatus, a mobile apparatus, and a scan job performing method thereof. The scan job performing method includes discovering at least one mobile apparatus supporting the scan-to-mobile function by using multicasting by the scanning apparatus, receiving information on at least one discovered mobile apparatus, setting a connection between the scanning apparatus and the mobile apparatus by using the received information of the mobile apparatus, and transmitting a scan image generated by the scanning apparatus to the mobile apparatus. With this configuration, authentication and connection between the scanning apparatus and the mobile apparatus are set by multicasting to thereby improve user's convenience.

14 Claims, 9 Drawing Sheets

(51) Int. Cl.
*H04L 29/12* (2006.01)
*H04W 8/00* (2009.01)

(52) U.S. Cl.
CPC . *H04N 1/00228* (2013.01); *H04N 2201/0036* (2013.01); *H04N 2201/0041* (2013.01); *H04N 2201/0055* (2013.01); *H04N 2201/0081* (2013.01); *H04W 8/005* (2013.01)

(58) Field of Classification Search
CPC ... H04N 2201/0055; H04N 2201/0081; H04N 2201/0036; H04W 8/005; G06F 3/1292
USPC .................................................. 358/1.15, 474
See application file for complete search history.

(56) References Cited

U.S. PATENT DOCUMENTS

| | | | | |
|---|---|---|---|---|
| 7,882,268 | B1* | 2/2011 | Broido | H04L 29/12066 709/245 |
| 8,446,917 | B2* | 5/2013 | Park et al. | 370/466 |
| 2004/0093386 | A1* | 5/2004 | Sakiyama | H04N 1/00241 709/206 |
| 2004/0157589 | A1* | 8/2004 | Watanabe et al. | 455/415 |
| 2006/0077459 | A1* | 4/2006 | Matsueda | H04N 1/00225 358/1.15 |
| 2006/0083208 | A1* | 4/2006 | Lin | H04W 76/021 370/338 |
| 2007/0183448 | A1 | 8/2007 | Ochiai | |
| 2007/0208863 | A1* | 9/2007 | Otsuka | H04N 1/00225 709/227 |
| 2008/0108299 | A1 | 5/2008 | Hullot et al. | |
| 2008/0172491 | A1 | 7/2008 | Chhabra et al. | |
| 2008/0239388 | A1* | 10/2008 | Kudo | H04N 1/00204 358/1.15 |
| 2009/0015862 | A1* | 1/2009 | Kim | H04N 1/00204 358/474 |
| 2009/0031035 | A1* | 1/2009 | Dharmaraju | H04W 8/005 709/230 |
| 2009/0052348 | A1* | 2/2009 | Kato | H04L 63/0492 358/1.15 |
| 2009/0103124 | A1 | 4/2009 | Kimura et al. | |
| 2009/0129324 | A1 | 5/2009 | Soneda | |
| 2009/0325557 | A1* | 12/2009 | Wada | H04L 67/36 455/414.4 |
| 2010/0100586 | A1 | 4/2010 | Bae | |
| 2010/0123932 | A1* | 5/2010 | Nakamura | G06F 3/1238 358/1.15 |
| 2010/0303003 | A1 | 12/2010 | Park et al. | |
| 2010/0306409 | A1* | 12/2010 | Jansen | H04L 29/12066 709/245 |
| 2011/0055218 | A1* | 3/2011 | Capuozzo | G06F 17/3002 707/741 |
| 2011/0116124 | A1* | 5/2011 | Shin | H04N 1/00225 358/1.15 |
| 2011/0252326 | A1* | 10/2011 | Asano | G06F 21/552 715/736 |
| 2012/0050818 | A1* | 3/2012 | Watanabe | H04N 1/00307 358/407 |
| 2012/0079409 | A1* | 3/2012 | Luo | G06F 8/36 715/772 |

FOREIGN PATENT DOCUMENTS

| | | |
|---|---|---|
| GB | 2429872 | 3/2007 |
| JP | 5-122497 | 5/1993 |
| JP | 2004040206 | 2/2004 |
| JP | 2006-5744 | 1/2006 |
| JP | 2006005744 | 1/2006 |
| JP | 2007-214654 | 8/2007 |
| KR | 10-2008-0038450 | 5/2008 |
| KR | 10-2010-0042930 | 4/2010 |
| KR | 10-0959015 | 5/2010 |

OTHER PUBLICATIONS

European Office Action dated Jul. 11, 2016 from European Patent Application No. 11191684.7, 6 pages.
Korean Office Action dated Sep. 19, 2016 from Korean Patent Application No. 10-2010-0122562, 17 pages.
Korean Office Action dated May 8, 2017 in corresponding Korean Patent Application No. 10-2010-0122562.

* cited by examiner

SCANNING APPARATUS, MOBILE APPARATUS, AND SCAN JOB PERFORMING METHOD THEREOF

CROSS-REFERENCE TO RELATED APPLICATIONS

This application claims priority from Korean Patent Application No. 10-2010-0122562, filed on Dec. 3, 2010 in the Korean Intellectual Property Office, the disclosure of which is incorporated herein by reference.

BACKGROUND OF THE INVENTION

1. Field of the Invention

Apparatuses and methods consistent with the exemplary embodiments relate to a scanning apparatus, a mobile apparatus, and a scan job performing method thereof, and more particularly, to a scanning apparatus which is connected to a mobile apparatus by multi-casting and transmits a generated scan image to the connected mobile apparatus, and a mobile apparatus connected to the scanning apparatus and a scan job performing method thereof.

2. Description of the Related Art

A scanning apparatus such as a scanner or a multi-function peripheral (MFP) scans, i.e., reads a document, and prints or transmits a scan image generated from the scanned document to the outside through a network, or to an external device through the network. The scanning apparatus may be connected to a plurality of host apparatuses, such as personal computers, through a network, and may perform a scan-to-PC function to transmit a generated scan image to a desired PC according to a predetermined communication protocol.

To perform the scan-to-PC function, the host PC discovers a connectable scanning apparatus in a network by broadcasting, and selects and transmits an IP address and port information of the host PC to the scanning apparatus to be used by a user among the discovered scanning apparatuses.

The scanning apparatus registers information on the host PC to which the information is transmitted and manages the host PC as a registered PC for predetermined time (e,g., 30 minutes). A user selects a desired PC from a list of the registered host PCs from the scanning apparatus and transmits a scan image generated by a scan job to the selected PC.

In line with an increased use of mobile apparatuses, such as smart phones, there is a growing demand for a scan-to-mobile function directly transmitting a scan image from the scanning apparatus to the mobile apparatus as well as to PCs.

However, it is difficult to apply the scan-to-PC function by a conventional broadcasting method to the mobile apparatus which has a lot of mobility. That is, the smart phone is held and moved frequently from place to place by a user, and exists in a network for short time. Thus, managing the PC information for predetermined time with the scanning apparatus like the conventional scan-to-PC is not appropriate.

More specifically, a user may need to discover a scanning apparatus in advance by broadcasting and register information of the PC with the scanning apparatus to apply the scan-to-PC function to the mobile apparatus.

In such a case, a user may need to identify the scanning apparatus and the smart phone by using a model name, an IP address, or the like. If a user is not familiar with the smart phone, he/she may feel difficult to identify the devices through the IP address but also may feel inconvenient in discovering and registering many scanning apparatuses when the smart phone is moved from network to network.

SUMMARY OF THE INVENTION

Accordingly, one or more exemplary embodiments provide a scanning apparatus, a mobile apparatus, and a scan job performing method thereof which authenticates and sets connection between the scanning apparatus and the mobile apparatus to thereby improve a user's convenience.

Additional features of the present general inventive concept will be set forth in part in the description which follows and, in part, will be obvious from the description, or may be learned by practice of the general inventive concept.

The foregoing and/or other features may be achieved by providing a scan job performing method of a scanning apparatus which is connected to at least one mobile apparatus supporting a scan-to-mobile function, the method including discovering at least one mobile apparatus supporting the scan-to-mobile function, by using multicasting by the scanning apparatus, receiving information on at least one discovered mobile apparatus, setting a connection between the scanning apparatus and the mobile apparatus by using the received information of the mobile apparatus, and transmitting a scan image generated by the scanning apparatus to the mobile apparatus.

The method may further include storing the received information of the mobile apparatus, and the information of the mobile apparatus may include an IP address, port information, and a telephone number of the mobile apparatus.

The method may further include displaying a list of at least one discovered mobile apparatus, and selecting one of the mobile apparatuses from the displayed list of mobile apparatuses.

The displaying the list of mobile apparatuses may include displaying a telephone number of at least one mobile apparatus.

The method may further include deleting stored information of the mobile apparatus if a transmission of the scan image is completed.

The method may further include monitoring whether the mobile apparatus is removed from a network zone to which the scanning apparatus belongs, and deleting the stored information of the mobile apparatus if it is determined that the mobile apparatus is removed from the network zone.

The foregoing and/or other features may also be achieved by providing a scan job performing method of at least one mobile apparatus which is connected to a scanning apparatus and supports a scan-to-mobile function, the method including performing a publication to the scan-to-mobile function by using multicasting by the mobile apparatus, transmitting information of the mobile apparatus to the scanning apparatus according to a performance result of the publication, setting a connection between the scanning apparatus and the mobile apparatus by using the transmitted information of the mobile apparatus, and receiving, by the mobile apparatus, a scan image from the scanning apparatus.

The information of the mobile apparatus may include an IP address, port information, and a telephone number of the mobile apparatus.

The received scan image may include a plurality of block images, and the method may further include generating a final image by processing the plurality of block images.

The method may further include displaying the generated final image.

The foregoing and/or other features may also be achieved by providing a scanning apparatus which is connected at least one mobile apparatus supporting a scan-to-mobile function, the scanning apparatus including a scanning unit which scans a document according to a scan-to-mobile command and generates a scan image, a communication unit which communicates with the mobile apparatus, and a controller which controls the communication unit to discover at least one mobile apparatus supporting the scan-to-mobile function by multicasting, to receive information of at least one discovered mobile apparatus, to set a connection between the scanning apparatus and the mobile apparatus by using the received information of the mobile apparatus, and to transmit the generated scan image to the mobile apparatus.

The scanning apparatus may further include a storage unit which stores therein the received information of the mobile apparatus, and the information of the mobile apparatus may include an IP address, port information, and a telephone number of the mobile apparatus.

The scanning apparatus may further include a display unit which displays thereon a list of at least one discovered mobile apparatus, and a user input unit which is used to select one of the mobile apparatuses from the displayed list of mobile apparatuses.

The list of mobile apparatuses may display a telephone number of at least one mobile apparatus.

The controller may delete the stored information of the mobile apparatus if the transmission of the scan image is completed.

The communication unit may monitor whether the mobile apparatus is removed from a network zone which the scanning apparatus is belonged thereto, and the controller may delete the stored information of the mobile apparatus if it is determined that the mobile apparatus is removed from the network zone, based on the monitoring result.

The foregoing and/or other features may also be achieved by providing at least one mobile apparatus which is connected to a scanning apparatus and supports a scan-to-mobile function, the mobile apparatus including a communication unit which communicates with the scanning apparatus, and a controller which controls the communication unit to perform a publication to the scan-to-mobile function by multicasting, to transmit information of the mobile apparatus to the scanning apparatus, to set a connection between the scanning apparatus and the mobile apparatus by using the transmitted information of mobile apparatus, and to receive a scan image from the scanning apparatus.

The information of the mobile apparatus may include an IP address, port information, and a telephone number of the mobile apparatus.

The received scan image may include a plurality of block images, and the mobile apparatus may further include an image processor which processes the plurality of block images and generates a final image.

The mobile apparatus may further include a display unit which displays thereon the generated final image.

Features of the present general inventive concept may also be realized by a scanning apparatus including a user interface to receive an input to perform a scan-to-mobile operation and to display a list of available mobile apparatuses, a communication unit to transmit a query to determine available mobile apparatuses and to receive mobile apparatus information from the available mobile apparatuses, and a controller to control the communication unit to transmit the multicast query in response to the user input to perform the scan-to-mobile operation and to control the user interface to display the list of the available mobile apparatuses based on the mobile apparatus information received by the communication unit.

The mobile apparatus information may include an IP address, port information, and a telephone number of the mobile apparatus.

The controller may control the communication unit to display the telephone number of each available mobile apparatus.

The scanning apparatus may further include memory to store the mobile apparatus information.

The communication unit may detect when a mobile apparatus has left a network corresponding to the scanning apparatus, and the controller may delete the mobile apparatus information from the memory when the communication unit may detect that the mobile apparatus has left the network.

The controller may detect whether a predetermined period of time has passed since a last-received transmission from a mobile apparatus and deletes the mobile apparatus information from the memory when the controller may detect that the predetermined period of time has passed.

The controller may detect whether a scan data transmission to the mobile apparatus has completed and may delete the mobile apparatus information from the memory when the controller determines that the scan data transmission has completed.

The communication unit may be a wireless communication unit, and the query is a multi-cast query.

Features of the present general inventive concept may also be realized by a mobile apparatus including a communication unit to receive from a scanning apparatus a query regarding ability to receive scan-to-mobile apparatus data, to transmit to the scanning apparatus mobile apparatus information in response to the query, and to receive from the scanning apparatus scan data in response to the transmission of the mobile apparatus information and a display unit to display the scan data.

The mobile apparatus information may include an IP address, port information, and a telephone number of the mobile apparatus.

The mobile apparatus may further include memory to store the scan data.

The communication unit may transmit scan-to-mobile publication data to the scanning apparatus at predetermined intervals while the mobile apparatus is connected to a same network as the scanning apparatus.

Features of the present general inventive concept may also be realized by a scanning system including a scanning apparatus to receive a user input to perform a scan-to-mobile operation, to transmit a query to determine available mobile apparatuses, to display information corresponding to available mobile apparatuses, and to transmit scan data to a selected one of the available mobile apparatuses, and at least one mobile apparatus to receive from the scanning apparatus the query, to transmit mobile apparatus information to the scanning apparatus in response to the query, and to receive the scan data from the scanning apparatus in response to the transmission of the mobile apparatus information.

The scanning apparatus may display the telephone numbers of each available mobile apparatus and may transmit the scan data to the selected one of the available mobile apparatuses corresponding to a selected telephone number.

Features of the present general inventive concept may also be realized by a method of transmitting scan data to a mobile apparatus, the method including receiving a user input to perform a scan-to-mobile operation, transmitting a query to determine available mobile apparatuses, receiving mobile apparatus information in response to the query, and transmitting scan data to a mobile apparatus corresponding to the mobile apparatus information.

The method may further include displaying a list of available mobile apparatuses based on the received mobile apparatus information, and transmitting scan data to the mobile apparatus selected from among the mobile apparatuses displayed on the list.

Displaying the list of mobile apparatuses may include displaying phone numbers of the mobile apparatuses and transmitting scan data to the mobile apparatus corresponding to a selected phone number.

The method may further include storing the received mobile apparatus information in memory.

The method may further include detecting when a mobile apparatus has left a network, and deleting the mobile apparatus information from the memory when the mobile apparatus has left the network.

The method may further include determining whether a predetermined period of time has passed since a last-received transmission from a mobile apparatus and deleting the mobile apparatus information from the memory when the predetermined period of time has passed.

The method may further include detecting whether a scan data transmission to the mobile apparatus has been completed and deleting the mobile apparatus information from the memory when the scan data transmission has been completed.

Transmitting the query may include wirelessly transmitting the query via multi-cast.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE PREFERRED EMBODIMENTS

Figure 1:
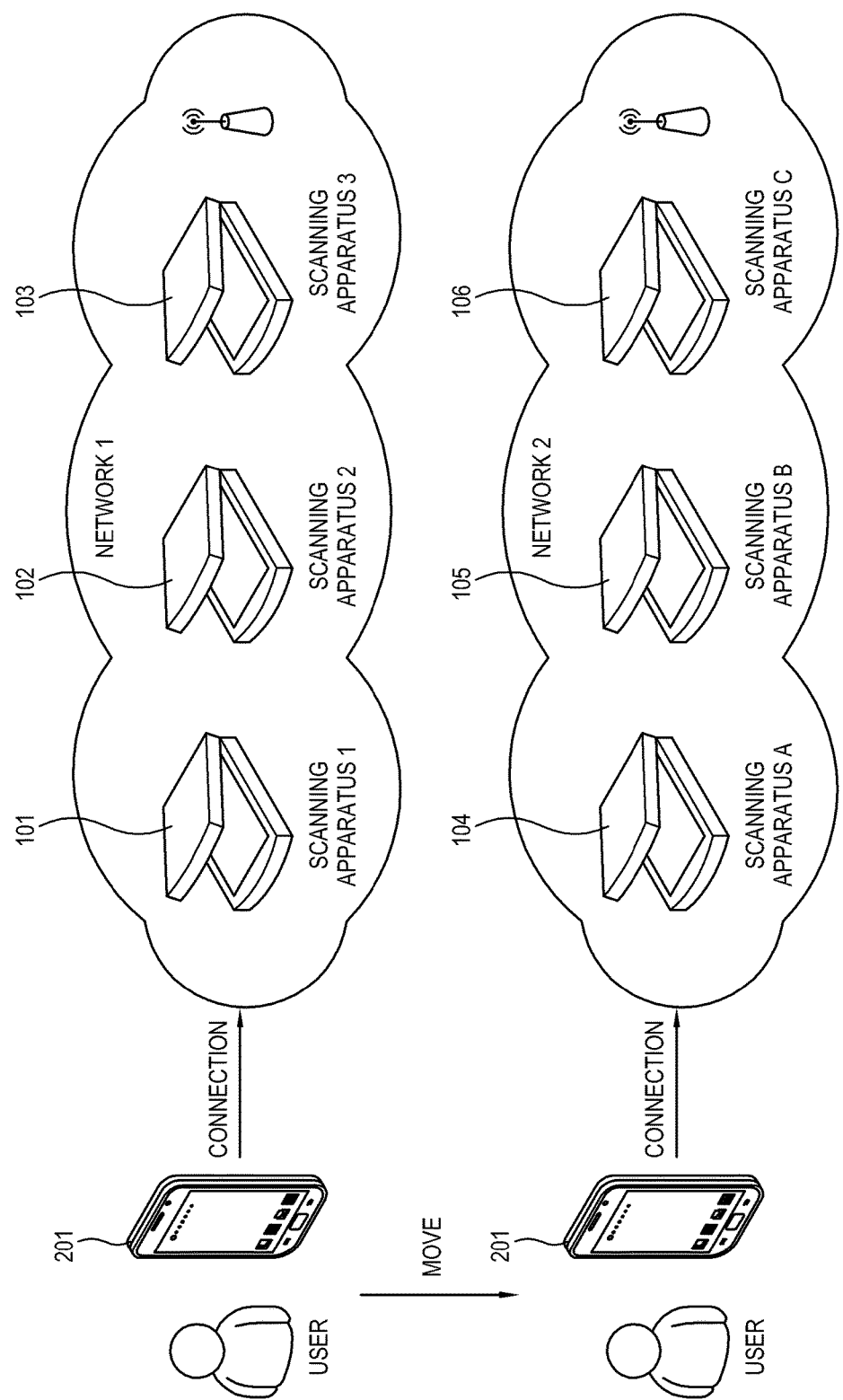
FIG. 1 illustrates a brief network environment including a scanning apparatus and a mobile apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 illustrates a network environment including a scanning apparatus and a mobile apparatus according to an exemplary embodiment of the present general inventive concept.

As shown therein, a mobile apparatus 201 according to the exemplary embodiment may join a predetermined network zone (network 1) including at least one of scanning apparatuses 101, 102, and 103, and may receive a scan image from the scanning apparatuses 101, 102, and 103 in the network through a scan-to-mobile function.

The mobile apparatus 201 may freely move to another network zone (network 2) by being held by a user, and may join the other network and receive a scan image from the scanning apparatuses A, B, C (104, 105, and 106), which are included in the other network, by the scan-to-mobile function in the other network.

The network zone (network 1 and network 2) is a service area in which a wireless network communication such as Wireless Fidelity (Wi-Fi), Wireless Broadband Internet (Wi-Bro), or Bluetooth is available.

Figure 2:
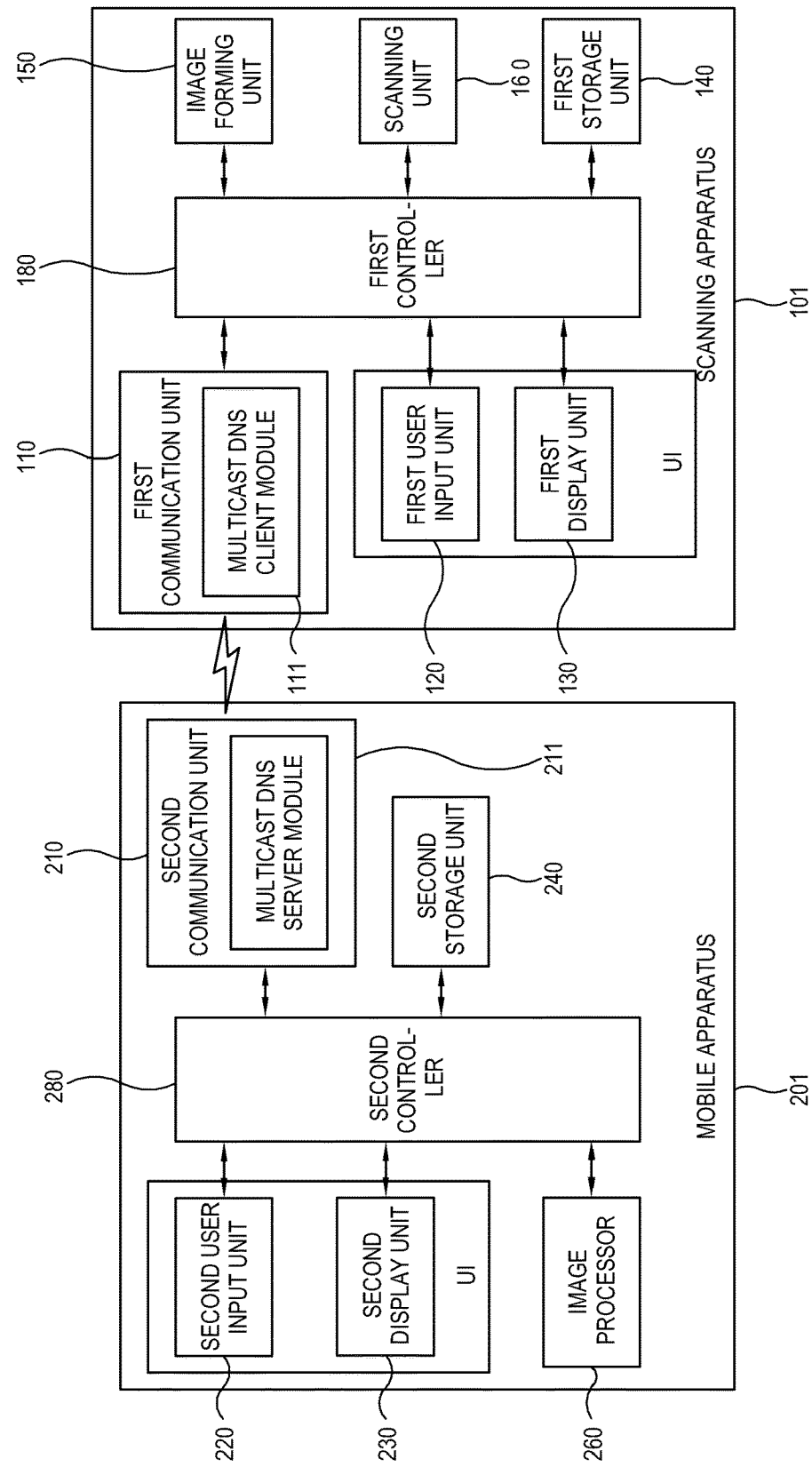
FIG. 2 is a block diagram of the scanning apparatus and the mobile apparatus according to the exemplary embodiment of FIG. 1.
Figure 3:
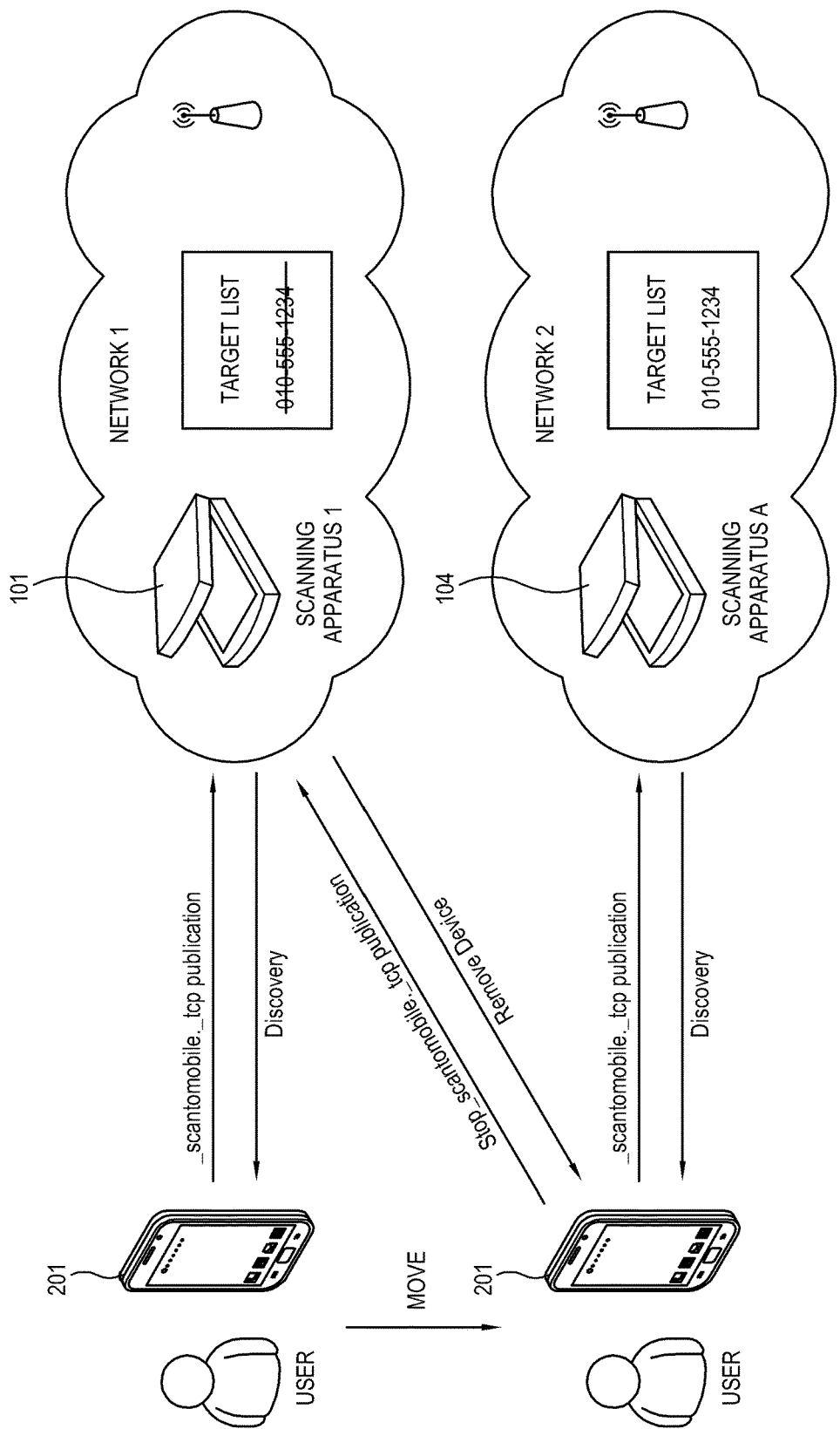
FIGS. 3 to 5 illustrate a job performed by a scan-to-mobile function according to the exemplary embodiment of FIG. 1.
Figure 4:
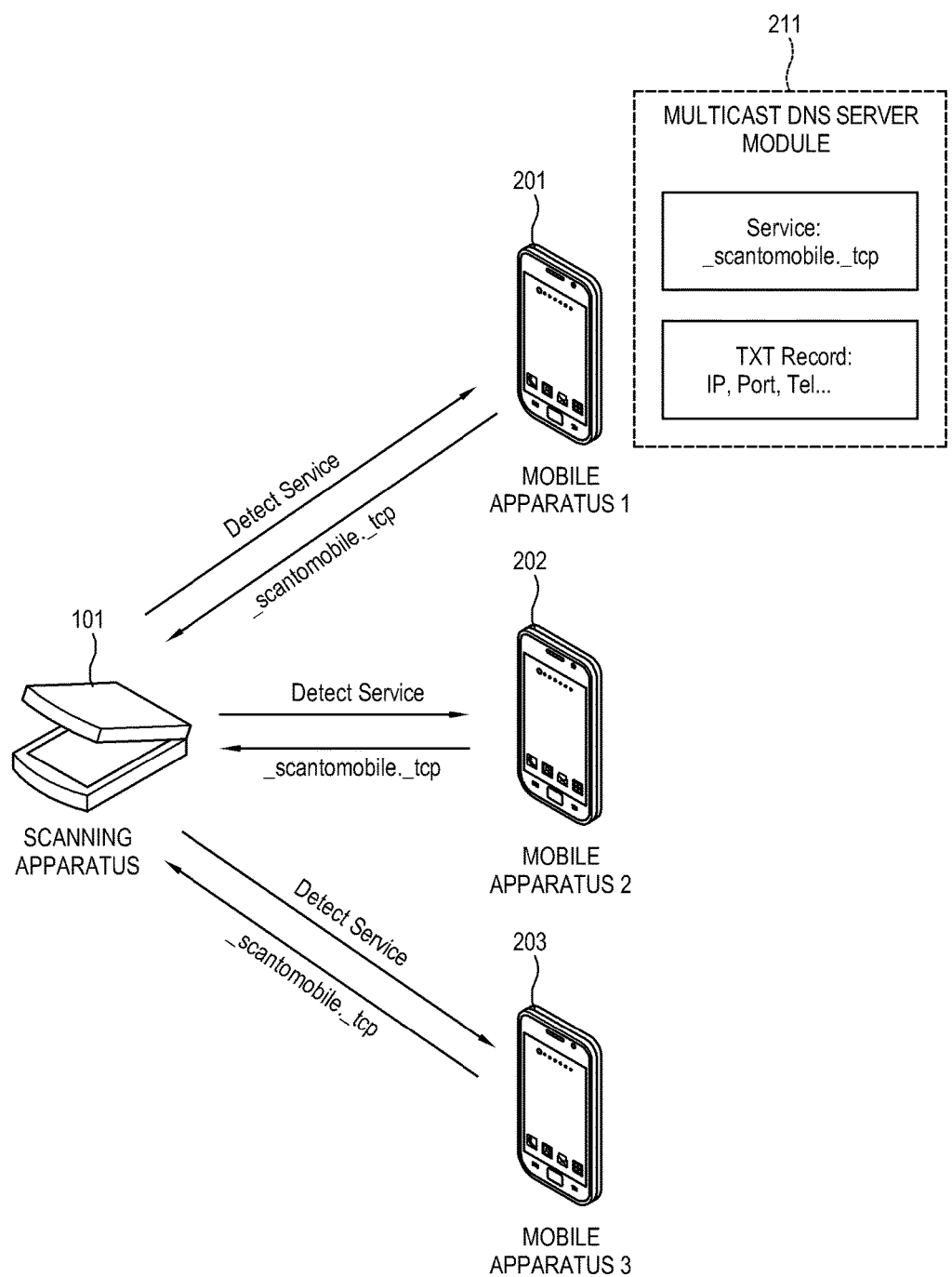
Figure 5:
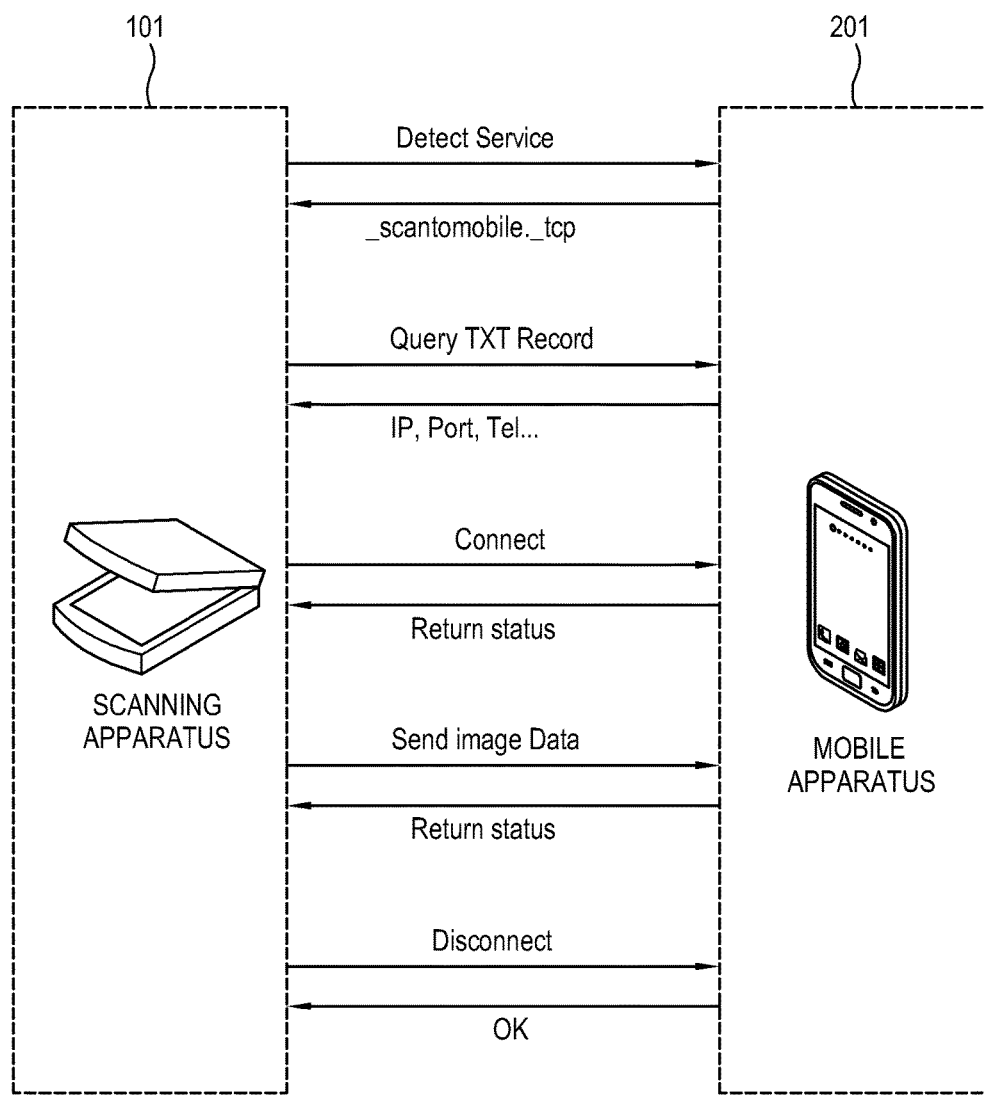

FIG. 2 is a block diagram of the scanning apparatus and the mobile apparatus according to the exemplary embodiment of FIG. 1. FIGS. 3 to 5 illustrate a job performed by the scan-to-mobile function according to the exemplary embodiment of FIG. 1.

The scanning apparatus 101 according to the present exemplary embodiment scans a document and generates a scan image from the document, and may include a scanner, a photocopier, or a multi-function peripheral (MFP) having two or more functions.

As shown in FIG. 2, the scanning apparatus 101 includes a first communication unit 110, a first user input unit 120, a first display unit 130, a first storage unit 140, an image forming unit 150, a scanning unit 160, and a first controller 180.

The first communication unit 110 communicates within a wireless network zone, and transmits to the mobile apparatus 201 a scan image generated by the scanning unit 160 by a user's selection of a scan-to-mobile (hereinafter, to be also called "scan-to-mobile apparatus", "scan-to-mobile phone", or "scan-to-smart phone") function.

As shown in FIGS. 3 and 4, the first communication unit 110 includes a multicast domain name system (DNS) client module 111 which discovers the mobile apparatus 201 supporting the scan-to-mobile function by multicasting, and detects a publication of information relating to the scan-to-mobile service of the mobile apparatus 201 (_scantomobile._tcp) with responding to the discovery.

The first communication unit 110 may further include a wired/wireless communication module which is connected to an external device including the mobile apparatus 201 by a predetermined protocol in a network or a universal serial bus (USB) port which is connected to a portable storage medium such as a USB memory stick. The first communication unit 110 may act as an input/output module which transmits a scan image generated by the scanning unit 160 to a target mobile apparatus 201.

The first user input unit 120 receives a user's command to select a function to transmit a scan image by the scan-to-mobile function.

The first controller 180 may control the first communication unit 110 to discover the mobile apparatus 201 supporting the scan-to-mobile function in the wireless network zone including the scanning apparatus 101, corresponding to the user's manipulation selecting the scan-to-mobile function.

The first user input unit 120 may receive a user's command to select a mobile apparatus 201 to which the scan image is transmitted from a list of mobile apparatuses supporting the scan-to-mobile function and discovered from the wireless network zone.

The first user input unit 120 may include a key button representing functions of the scanning apparatus 101, or a graphic user interface (GUI) generated by an execution of a predetermined application and displayed on the first display unit 130 to receive a user's input. If the first user input unit 120 includes a GUI, the scanning apparatus 201 displays a GUI of a list of mobile apparatuses supporting the scan-to-mobile function and discovered from the wireless network zone and receives a user's selection through the displayed GUI. The list of mobile apparatuses may be displayed in telephone numbers as in FIG. 3.

The first display unit 130 displays a menu to receive a user's selection for the scan-to-mobile function and displays mobile apparatuses supporting the scan-to-mobile function and discovered from the wireless network zone. If there are at least two mobile apparatuses supporting the scan-to-mobile function, the first display unit 130 may display a list of at least two discovered mobile apparatuses to be selected by a user.

The first display unit 130 may include a liquid crystal display (LCD) and a driver (not shown) to drive the LCD.

The first user input unit 120 and the first display unit 130 may be included in a UI, and may include an operation panel of the scanning apparatus 101.

The first storage unit 140 stores therein information relating to the scan-to-mobile function of the discovered mobile apparatus. The stored information may include an IP address, port information, and a telephone number of the mobile apparatus 201, and may be stored as text (TXT) records information.

The TXT records information according to the present exemplary embodiment is additional information on the scan-to-mobile service, and includes an IP header, a UDP header, a DNS message header, and a test field having information.

The scanning apparatus 201 sets a TCP connection with the mobile apparatus 201 by using the TXT records information of the mobile apparatus 201, and transmits a scan image through the TCP connection.

The first storage unit 140 may further store therein a scan image generated by the scanning unit 160, print data or fax data received from the outside, user registration information set for each user account, user authentication information, usage authorization information, and other various information.

The first storage unit 140 includes an internal storage medium such as a hard disk drive (HDD) or an external or portable storage medium such as a USB memory stick, or a memory card (memory stick, CF card and MMC).

Upon receiving a print command, the image forming unit 150 forms an image on at least one print medium (paper) based on print data. The print job includes printing a scan document for copying, printing received fax data, and printing print data received from the outside through a host apparatus (not shown) including a server or stored in the inside (HDD) or outside (USB memory) of the scanning apparatus 101. The image forming unit 150 according to the present exemplary embodiment includes a developing unit including an image carrier, a light scanning unit, a transfer unit and a fusing unit.

If the scanning apparatus 101 includes the image forming unit 150, the scanning apparatus 101 may include a MFP.

The MFP includes a single color image forming apparatus forming an image by using a single color developer (generally black color), a color image forming apparatus forming a color image by using a four color developer and a multi-color image forming apparatus forming a color image by using an auxiliary developer such as a white color developer in addition to the four color developer.

The scanning unit 160 scans a document and generates a scan image. The document that is scanned may be a text or graphic document on paper or another printing medium, a photo, a film or the like. The scanning unit 160 may include an optical conversion element such as a charge coupled device (CCD) and a contact image sensor (CIS), and an image processor which generates an image from a document by using a signal output by the optical conversion element. The scanning unit 160 may further include a scan motor to drive the optical conversion element and the image processor, and a guide.

The scan data scanned by the scanning unit 160 may be converted into a fax signal and transmitted to an external fax machine by a fax modem (not shown). In addition, the scan data may be converted into a format for email (such as .pdf, .giff, etc.), may be stored in memory of the scanning unit 160, or may be converted to print data and transmitted to a printing unit to print the scan data.

The first controller 180 controls the scanning apparatus 101 as a whole. More specifically, the first controller 180 controls the first communication unit 110 to discover and detect the mobile apparatus 201 which is published by multicast in the network zone including the scanning apparatus 101 corresponding to a user's selection of the scan-to-mobile function, and to receive the TXT records information of the detected mobile apparatus 201. The first controller 180 stores the received TXT records information in the first storage unit 140.

The first controller 180 parses the received TXT records information, and displays on the first display unit 130 a list in a form to be easily selected by a user such as a telephone number as in FIG. 3, and sets the connection between the mobile apparatus 201 selected from the displayed list and the scanning apparatus 101.

The first controller 180 controls the scanning unit 160 to scan an image and to generate a scan image corresponding to the scan-to-mobile command, and controls the first communication unit 110 to transmit the generated scan image to the corresponding mobile apparatus 201.

If the mobile apparatus 201 is removed from the network zone as in FIG. 3, the publication of the scan-to-mobile function from the mobile apparatus 201 is stopped (Stop-_scantomobile._tcp), and the first controller 180 deletes the information on the mobile apparatus 201 from the first storage unit 140.

If the mobile apparatus 201 which is removed from the network zone 1 moves to another network zone (network 2) as in FIG. 3, the mobile apparatus 201 is connected to the scanning apparatus A 104 included in the network 2 to perform the scan-to-mobile function.

As in FIG. 4, the scanning apparatus 101 may detect a scan-to-mobile service (Service:_scantomobile._tcp) published by a plurality of mobile apparatuses 201, 202, and 203, receive the TXT records information from each of the mobile apparatuses 201, 202, and 203 and transmit the scan image to at least one corresponding mobile apparatus.

The mobile apparatus 201 according to the present exemplary embodiment may receive, store, or display a scan image from the scanning apparatus 101, and may include a smart phone, for example.

As shown in FIG. 2, the mobile apparatus 201 includes a second communication unit 210, a second user input unit 220, a second display unit 230, a second storage unit 240, an image processor 260 and a second controller 280.

The second communication unit 210 communicates within a wireless network zone, and receives a scan image generated by the scanning apparatus 101 by a user's selection of a scan-to-mobile (hereinafter to be also called "scan-to-mobile phone" or "scan-to-smart phone") function.

The second communication unit 210 includes a multicast DNS server module 211 which publishes the scan-to-mobile service by multicasting.

More specifically, referring to FIG. 3, the multicast DNS server module 211 regularly publishes the scan-to-mobile (_scantomobile._tcp) function (i.e., service) and announces to the scanning apparatuses 101 and 104 of the network zone (network 1 and network 2) that the mobile apparatus 101 joins the network zone.

If the mobile apparatus 201 is removed from a predetermined network zone (network 1), the publication of the scan-to-mobile (_scantomobile._tcp) service by the second communication unit 201 is suspended, and the scanning apparatus 101 cannot detect the mobile apparatus 201. Thus, the information on the mobile apparatus 101 is removed from the list of the mobile apparatuses supporting the scan-to-mobile service.

The second communication unit 210 may further include a communication module which is connected to an external device including the scanning apparatus 101 by a predetermined protocol in a network. The second communication unit 210 may act as a listener of the server to connect the scanning apparatus 101 and the mobile apparatus 201.

The second user input unit 220 receives a user's command. The second user input unit 220 may include a key button provided in the mobile apparatus 201, or a GUI generated by an execution of a predetermined application and displayed on the second display unit 230 to receive a user's input.

The second display unit 230 displays thereon a scan image transmitted by the scanning apparatus 101. The second display unit 230 may include an LCD and a driver (not shown) to drive the LCD.

The second user input unit 220 and the second display unit 230 are included in a UI.

The second storage unit 240 stores therein various information of the mobile apparatus 201 and a scan image received from the scanning apparatus 101. The information of the mobile apparatus 201 may include an IP address, port information, and a telephone number of the mobile apparatus 201 as TXT records information. The TXT records information is transmitted by the second communication unit 210 to the scanning apparatus 101 supporting the scan-to-mobile service.

The second storage unit 240 includes an internal memory or an external memory such as a USB memory and an SD memory.

The image processor 260 processes a scan image received from the scanning apparatus 101 and generates a final image to be displayed on the second display unit 230.

That is, the scan image generated by the scanning apparatus 101 may be transmitted in a plurality of divided block data due to the limited capacity of the memory of the mobile apparatus 201. The image processor 260 receives and processes the divided block data, and generates a final image incorporating such divided block data. The generated final image may be in a compressed form and file format corresponding to the setting of the mobile apparatus 201.

The second controller 280 controls the mobile apparatus 201 as a whole. More specifically, the second controller 280 controls the first communication unit 210 to regularly publish that the mobile apparatus 201 supports the scan-to-mobile (_scantomobile._tcp) service by multicasting as in FIGS. 3 to 5, and to transmit the TXT records information.

If the mobile apparatus 201 is connected to the scanning apparatus 201, the second controller 280 regularly returns status information of the mobile apparatus 201. For example, the status information may be returned at predetermined intervals of once per second, once per thirty seconds, once per minute, or at any other predetermined interval.

The second controller 280 controls the second communication unit 210 to receive the scan image from the scanning apparatus 101, and controls the image processor 260 to process the received scan image and generate a final image.

If the mobile apparatus 201 is removed from a predetermined network zone (network 1) as in FIG. 3, the publication of the scan-to-mobile service to the scanning apparatus 101 is suspended. If the mobile apparatus 201 moves to another network zone (network 2), the publication is performed to the scanning apparatus 104 included in the network zone (network 2).

If a plurality of mobile apparatuses 201, 202, and 203 exists in the network zone as in FIG. 4, each of the mobile apparatuses 201, 202, and 203 performs the publication independently, and transmits the TXT records information. The scanning apparatus 101 detects the publication of each of the plurality of mobile apparatuses 201, 202, and 203, and sets the connection between the mobile apparatuses 201, 202, and 203 and the scanning apparatus 101.

A user may set a user ID and a password to use the scan-to-mobile function through the second user input unit 220 of the mobile apparatus 201 for security. The set ID and password information is stored in the second storage unit 240.

If a user selects the scan-to-mobile function from the scanning apparatus 101, the first controller 180 controls the first display unit 130 to display thereon a screen requesting an input of the ID and the password to a user. If a user inputs the ID and password by manipulating the first user input unit 120, the input ID and password are transmitted to the mobile apparatus 201 through the first communication unit 110.

The mobile apparatus 201 which receives the ID and password is discovered to support the scan-to-mobile function by multicasting, and becomes a mobile apparatus selected as a target mobile apparatus by a user from the discovered list.

The second controller 280 of the mobile apparatus 201 compares the ID and password stored in the second storage unit 240 with the ID and password transmitted by the scanning apparatus 101 for an authentication of a user. If the authentication is performed normally, the second controller 280 of the mobile apparatus 201 notifies the scanning apparatus 101 of the foregoing through the second communication unit 210.

Then, the scanning apparatus 101 transmits the scan image to the mobile apparatus 201 for which the authentication process is completed with the ID and password. The mobile apparatus 201 processes the received scan image and generates a final image, and displays the final image on the second display unit 230.

Hereinafter, a scan job performing method of the scanning apparatus and mobile apparatus will be described with reference to FIGS. 6A and 6B.

Figure 6A:
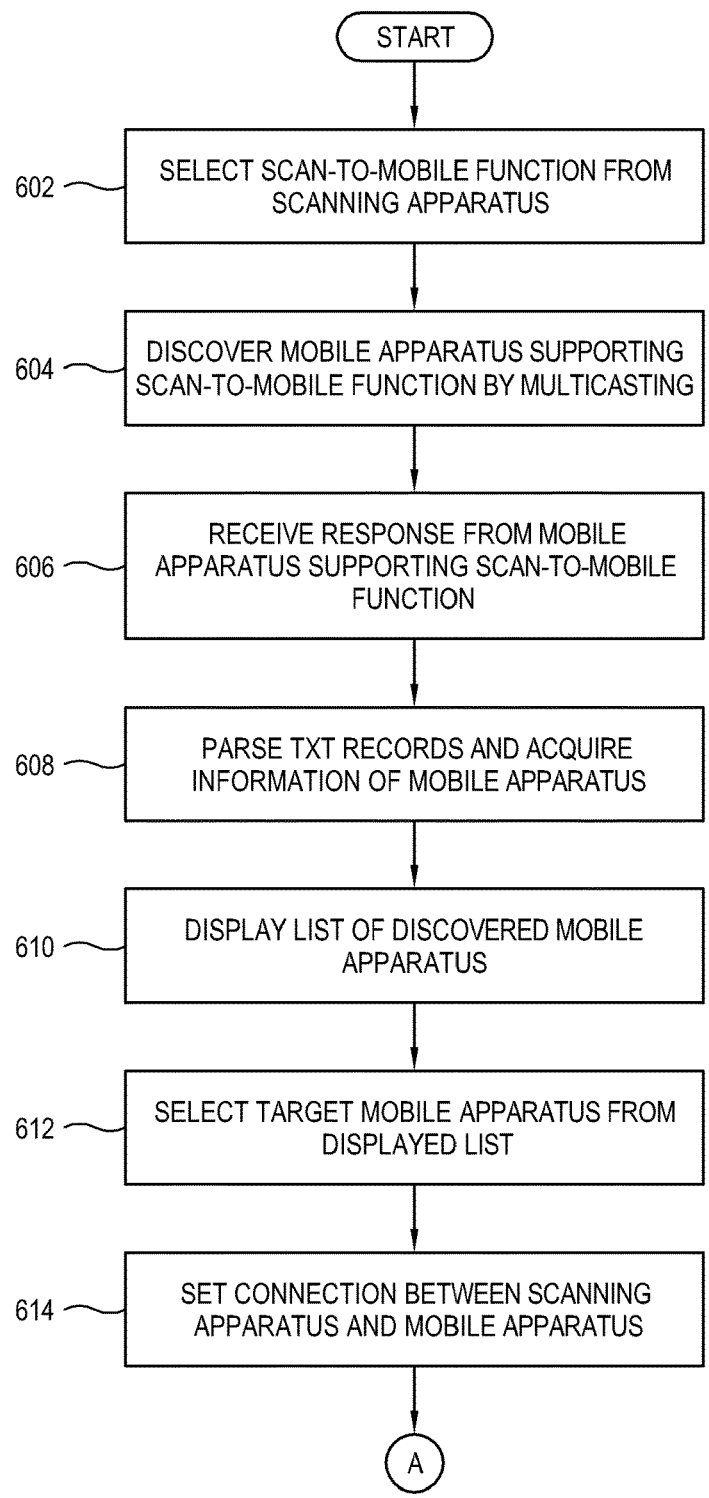
FIGS. 6A and 6B are flowcharts of a scan job performing method according to the exemplary embodiment of FIG. 1.
Figure 6B:
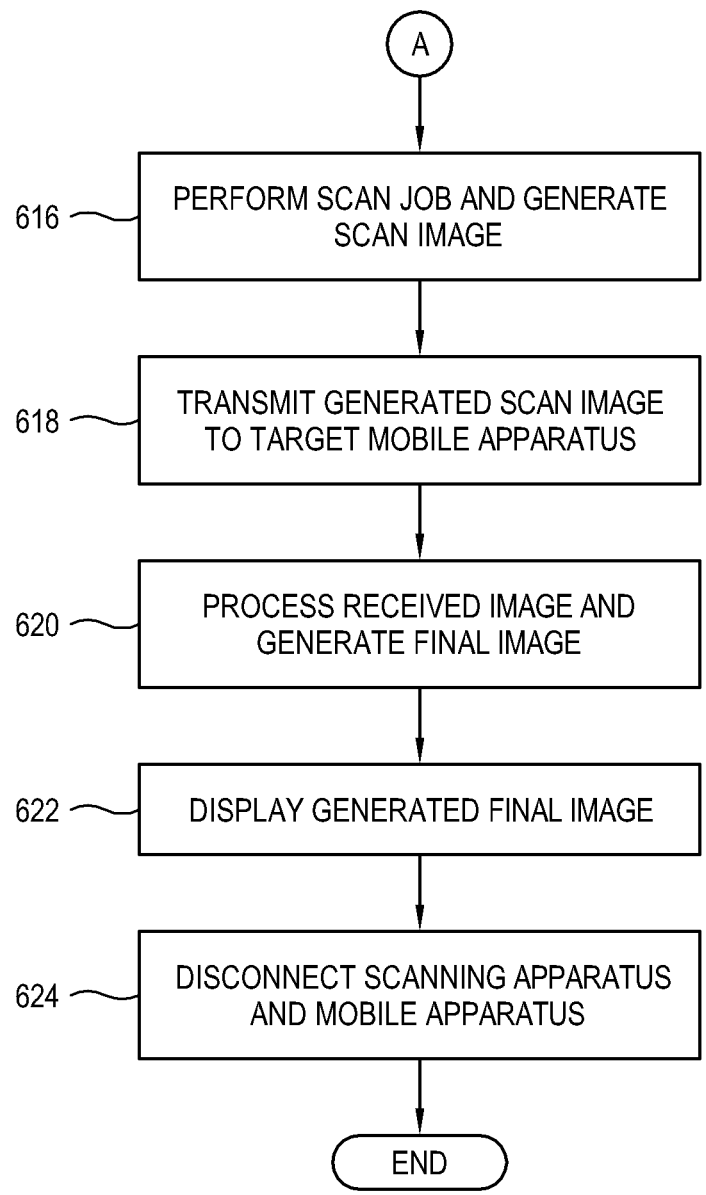

FIGS. 6A and 6B are flowcharts of a control method of an image forming apparatus according to an exemplary embodiment.

As shown in FIG. 6A, a user may select the scan-to-mobile function by manipulating the UI of the scanning apparatus (602).

The multicast DNS client module 111 of the scanning apparatus 101 discovers the mobile apparatus 201 supporting the scan-to-mobile (_scantomobile._tcp) function in the network zone, by multicasting (604). The multicast DNS client module 111 may query whether the mobile apparatus 201 which supports the scan-to-mobile service currently exists in the network.

The scanning apparatus 101 receives a response to the query from the mobile apparatus 201 which supports the scan-to-mobile function in the network zone (606). The mobile apparatus 201 regularly publishes the support of the scan-to-mobile service, and the scanning apparatus 101 receives the response to the publication. The multicast DNS server module 211 of the mobile apparatus 201 transmits to the scanning apparatus 201 the TXT records information of the mobile apparatus 201 by publication. The TXT records information includes an IP address, port information, and telephone number of the mobile apparatus 201.

The scanning apparatus 101 parses the TXT records information of the mobile apparatus 201, and acquires the information of the mobile apparatus 201 (608). The acquired information includes the IP address, port information, and telephone number of the mobile apparatus 201.

The scanning apparatus 101 displays on the first display unit 130 a list of the mobile apparatuses 201 which have responded to the query (610). The first controller 180 may control the first display unit 130 to display the list of the mobile apparatus 201 in a telephone number, by using the parsed information. A user may identify the mobile apparatus with the telephone number instead of the IP address which is not identified easily by a user, and may select a target mobile apparatus 201 for the scan-to-mobile service.

A user selects the target mobile apparatus from the displayed list (612).

Then, the connection between the scanning apparatus 101 and the selected mobile apparatus 201 is set (614). The scanning apparatus 101 may set the TCP connection with the mobile apparatus 201 by using the IP address and the port information acquired from the target mobile apparatus 201.

As shown in FIG. 6B, the scanning apparatus 101 performs a scan job with respect to the scan-to-mobile command and generates the scan image (616).

The first controller 180 transmits the generated scan image to the selected target mobile apparatus 201 (618).

The mobile apparatus 201 processes the received image and generates the final image (620).

The generated final image is displayed on the second display unit 230 (622). Then, the scan-to-mobile job of the scanning apparatus 101 is completed.

If the transmission of the scan image is completed at operation 618, the scanning apparatus 101 and the mobile apparatus 201 may be disconnected (624). If the mobile apparatus 201 is removed from the network zone, such connection between the scanning apparatus 101 and the mobile apparatus 201 may be disconnected.

Figure 7:
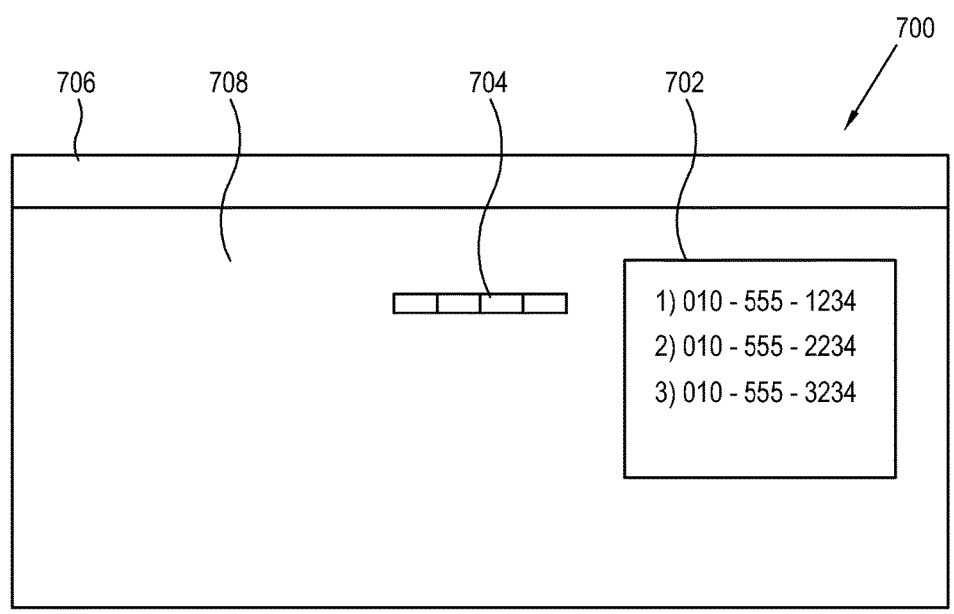
FIG. 7 illustrates an example of a scanning apparatus according to an embodiment of the general inventive concept.

FIG. 7 illustrates an example of a scanning apparatus 700 according to an embodiment of the present general inventive concept. The scanning apparatus 700 may correspond to the scanning apparatuses 101-106 of FIG. 1, for example. The scanning apparatus 700 may include a screen 702 to display information regarding mobile devices that are connected to the scanning apparatus 700 via a network. The mobile devices may correspond to cellular telephones or smart phones capable of connecting to the network, and the list of mobile devices may be a list of telephone numbers of the mobile devices. The screen 702 may be a touch-screen, as illustrated in FIG. 7, or the scanning apparatus 700 may include a keypad, keyboard, or other user input mechanism to receive user input. In addition, the scanning apparatus 700 may have one or more buttons 704 to perform operations of the scanning apparatus 700, such as a scan having predetermined settings, a power-off, low-power, or any other desired function. The scanning apparatus 700 may include a lid 706 and main body 708, as illustrated in FIG. 7, or the scanning apparatus 700 may include a slot to receive a document to be scanned, or may have any other desired configuration to scan the document. In addition, the screen 702 may be located on the main body 708, the lid 706, or may be part of a separate device that controls functions of the scanning apparatus 700.

Figure 8:
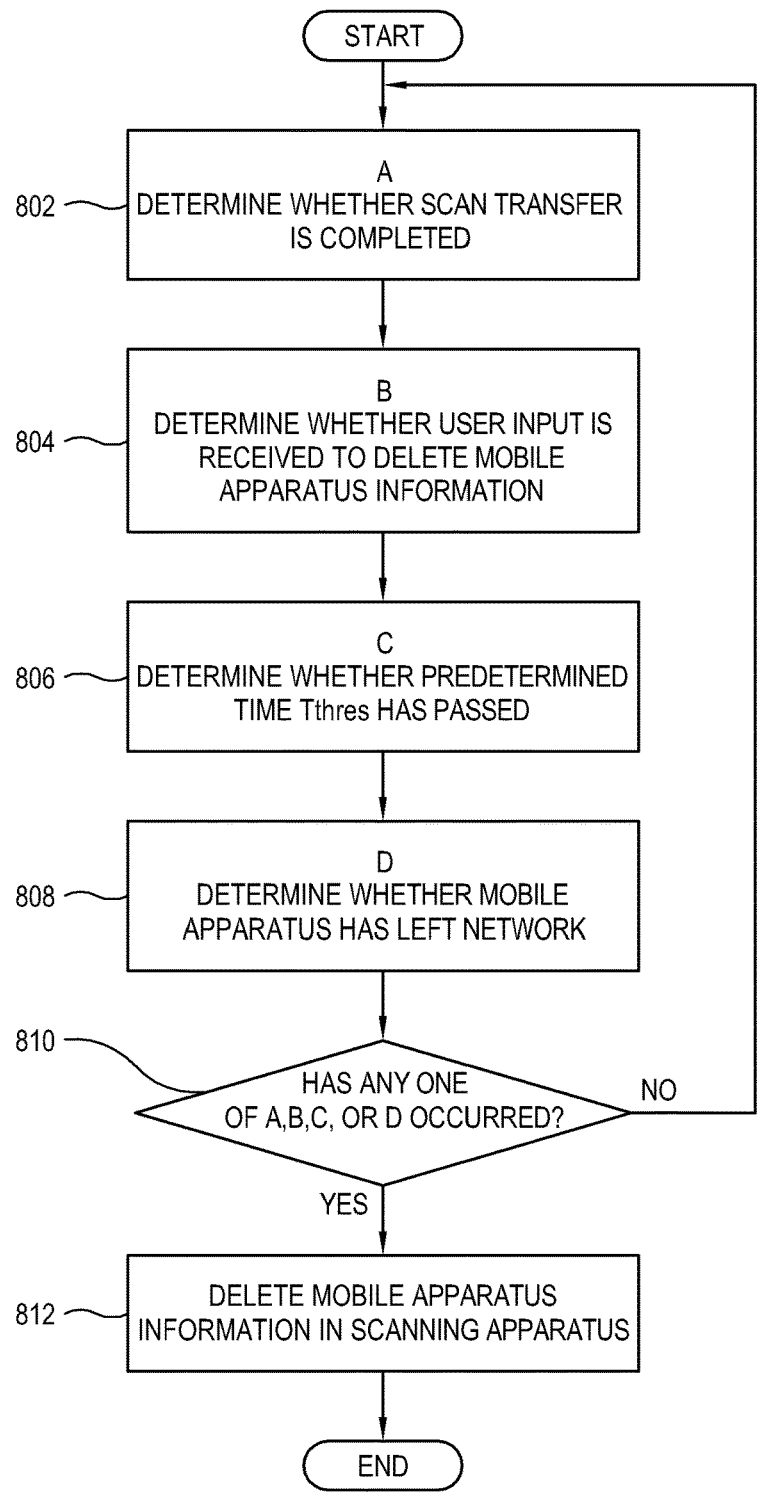
FIG. 8 illustrates a method of deleting mobile apparatus information according to an embodiment of the general inventive concept.

As discussed above, the scanning apparatus 101 may delete the stored information of the mobile apparatus 201 when it is determined that predetermined conditions have been met. The deletion may occur automatically without a user input to instruct the scanning apparatus 101 to delete the information. Consequently, a scanning apparatus 101 that may be connected to a large number of mobile apparatuses 201 over time does not waste storage space with information of mobile apparatuses 201 that are no longer connected to the scanning apparatus 101 via the network FIG. 8 illustrates a method of determining whether to delete the mobile apparatus information in the first storage unit 140 of the scanning apparatus 101 of FIG. 1, for example. The first controller 180 may determine whether each of a plurality of conditions is met, each of which may independently result in deletion of the mobile apparatus information from the first storage unit 140 of the scanning apparatus 101. The first controller 180 may determine whether a transfer of scanned data from the scanning apparatus 101 to the mobile apparatus 201 is complete (802). The first controller 180 may determine whether a user input has been received to delete the mobile apparatus information (804). The first controller 180 may determine whether a predetermined period of time Tthres has passed (806). For example, if the predetermined period of time Tthres is five minutes, the first controller 180 may compare a time Tmeas measured from an end of a scan operation or from a time at which the mobile apparatus 201 connected to or disconnected from the network, and may delete the mobile apparatus information from the first storage unit 140 if the measured time Tmeas is greater than the threshold time Tthres.

The first controller 180 may determine whether the mobile device has left the network. For example, if the mobile apparatus 201 stops transmitting an acknowledgement or a signal indicating that it is connected to the network, the first controller 180 may determine that the mobile apparatus 201 is no longer connected to the network.

If any one of the above conditions is met (810), the controller 180 may delete the mobile apparatus 201 information from the first storage unit 140 (812). However, it is noted that each of the above conditions is not necessary, and other conditions may be used to determine whether to delete the mobile apparatus information. For example, the scanning apparatus may be configured to delete the mobile apparatus information only when a user input is received, a predetermined period of time passes, or it is determined that the mobile apparatus has left the network.

The above predetermined conditions may automatically delete the mobile apparatus information (except for the condition that a user input is detected) without receiving input from a user to indicate that the mobile apparatus information should be deleted. In other words, while a user may explicitly indicate that the mobile apparatus information should be deleted, the information may be set to be deleted even when the explicit input is not received from a user. As a result, a user that moves from one network to another need not repeatedly delete mobile apparatus information from different scanning apparatuses, and the scanning apparatuses may conserve storage space, even when a large number of mobile apparatuses have accessed the scanning apparatus.

As described above, a scanning apparatus, a mobile apparatus and a scan job performing method thereof according to the present general inventive concept authenticates and sets a connection between the scanning apparatus and mobile apparatus by multicasting to thereby improve user's convenience.

Also, a scanning apparatus, a mobile apparatus and a scan job performing method thereof according to the present general inventive concept displays by telephone number a list of mobile apparatuses discovered by multicasting to enable a user who is not familiar with the wireless network environment to use a scan-to-mobile function without difficulty.

In the present specification and claims, a mobile apparatus or mobile device is particularly defined as an electronic device designed to be portably carried with a user, such as a phone, laptop, or tablet PC, and is distinguished from a desktop computer or other stationary device which is designed to remain at one location for a semi-permanent period of time. For example, a desktop PC may have a large power cord and may have a large and heavy profile compared to a mobile apparatus, such as a smart phone, laptop, or tablet PC, which have small and light profiles.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A scan job performing method of a scanning apparatus supporting a scan-to-mobile function, the method comprising:
   receiving a user input to perform the scan-to-mobile function in the scanning apparatus;
   discovering a plurality of devices that support the scan-to-mobile function by performing wireless multicasting, in response to the user input to perform the scan-to-mobile function, the plurality of devices including a mobile apparatus;
   receiving information regarding each of the plurality of devices and storing the information regarding the plurality of devices in the scanning apparatus, the information regarding the mobile apparatus being received from the mobile apparatus and including text (TXT) records information including an IP address, port information, and a telephone number of the mobile apparatus;
   parsing the received TXT records information to acquire the IP address, the port information, and the telephone number of the mobile apparatus;
   generating a list of the plurality of devices that are determined as supporting the scan-to-mobile function discovered based on the multicasting, and displaying the list of the plurality of devices, the displayed list of the plurality of devices including the mobile apparatus identified by the telephone number of the mobile apparatus;
   receiving a user input selecting the mobile apparatus from the displayed list;
   wirelessly connecting the scanning apparatus to the mobile apparatus using the TXT records information received from the mobile apparatus, in response to receiving the user input selecting the mobile apparatus;
   generating a scan image by the scanning apparatus;
   transmitting the scan image from the scanning apparatus to the mobile apparatus; and
   deleting the information of the mobile apparatus from the stored information regarding each of the plurality of devices stored in the scanning apparatus, if a transmission of the scan image from the scanning apparatus to the mobile apparatus is completed,
   wherein the deleting the information of the mobile apparatus comprises:
   deleting the information of the mobile apparatus automatically without a user input to instruct the scanning apparatus to delete the information of the mobile apparatus, when detecting that an elapsed time beginning from a point in time corresponding to when transmission of the scan image from the scanning apparatus to the mobile apparatus is completed is greater than a predetermined period of time.

2. The method according to claim 1, further comprising setting a wireless connection between the scanning apparatus and the mobile apparatus based on the information of the mobile apparatus.

3. The method according to claim 1, further comprising:
   receiving, by the mobile apparatus, the scan image from the scanning apparatus, the received scan image comprising a plurality of block images; and
   generating a final image by processing the plurality of block images.

4. The method according to claim 3, further comprising displaying the generated final image.

5. The method according to claim 1, wherein the list of the plurality of devices enables selection of at least one of a scanning apparatus and another mobile apparatus with regard to the scan-to-mobile function.

6. A scanning apparatus supporting a scan-to-mobile function, the scanning apparatus comprising:
   a user interface to receive a user input scan-to-mobile command to perform the scan-to mobile function in the scanning apparatus;
   a scanner to scan a document according to the user input scan-to-mobile command and to generate a scan image;
   a controller to discover a plurality of devices that support the scan-to-mobile function by performing wireless multicasting, in response to the user input scan-to-mobile command, and to generate a list of the plurality of devices that are determined as supporting the scan-to-mobile function, the list of the plurality of devices including a mobile apparatus;
   a display to display the list of the plurality of devices with regard to the scan-to-mobile function, wherein the user interface is to receive a user input selecting the mobile apparatus from the displayed list;
   a communication interface:

to receive information regarding each of the plurality of devices included in the list of the plurality of devices, the information regarding the mobile apparatus being received from the mobile apparatus and including text (TXT) records information including an IP address, port information, and a telephone number of the mobile apparatus, to wirelessly connect the scanning apparatus to the mobile apparatus using the TXT records information received from the mobile apparatus, in response to the mobile apparatus being selected from the displayed list based on the information of the mobile apparatus, and to transmit the generated scan image from the scanning apparatus to the mobile apparatus; and a storage to store the information regarding each of the plurality of devices, wherein the controller is to parse the received TXT records information to acquire the IP address, the port information, and the telephone number of the mobile apparatus, the controller is to automatically without a user input instruct the scanner to delete the information of the mobile apparatus from the stored information regarding each of the plurality of devices, when the controller detects that an elapsed time beginning from a point in time corresponding to when the transmission of the generated scan image from the scanner to the mobile apparatus is completed is greater than a predetermined period of time, and the displayed list of the plurality of devices includes the mobile apparatus identified by the telephone number of the mobile apparatus.

7. The scanning apparatus according to claim 6, wherein the controller is to set a wireless connection between the scanning apparatus and the mobile apparatus based on the information of the mobile apparatus.

8. The scanning apparatus according to claim 6, wherein the communication interface is to monitor whether the mobile apparatus is removed from a network zone to which the scanning apparatus belongs, and the controller is to delete the information of the mobile apparatus from the stored information regarding each of the plurality of devices, if the mobile apparatus is removed from the network zone.

9. The scanning apparatus according to claim 6, wherein the communication interface is to transmit the generated scan image in a plurality of divided block data to be processed by the mobile apparatus to generate a final image.

10. The scanning apparatus according to claim 9, wherein the communication interface is to transmit the generated scan image in the plurality of divided block data based on a capacity of the storage.

11. A scanning apparatus, comprising:
a user interface to receive a user input scan-to-mobile command to perform a scan-to mobile function in the scanning apparatus;
a scanner to scan a document according to the user input scan-to-mobile command and to generate a scan image;
a controller to discover a plurality of devices that support the scan-to-mobile function by performing wireless multicasting, in response to the user input scan-to-mobile command, and to generate a list of the plurality of devices that are determined as supporting the scan-to-mobile function, the list of the plurality of devices including a mobile apparatus, wherein the user interface is to display a list of the plurality of devices with regard to the scan-to-mobile function and to receive a user input to select the mobile apparatus from the displayed list; and a communication interface to receive information regarding each of the plurality of devices included in the list of the plurality of devices, the information regarding the mobile apparatus being received from the mobile apparatus and including text (TXT) records information including an IP address, port information, and a telephone number of the mobile apparatus; and a memory to store the information regarding each of the plurality of devices, wherein the controller is:
to parse the TXT records information to acquire the IP address, the port information, and the telephone number of the mobile apparatus, to control the communication interface to wirelessly connect to the mobile apparatus based on the parsed TXT records information of the mobile apparatus, in response to the mobile apparatus being selected from the displayed list, to control the communication interface to transmit the scan image generated by the scanner from the scanner to the mobile apparatus, and to automatically without a user input instruct the scanner to delete the information of the mobile apparatus from the stored information regarding each of the plurality of devices, when the controller detects that an elapsed time beginning from a point in time corresponding to when the transmission of the generated scan image from the scanner to the mobile apparatus is completed is greater than a predetermined period of time.

12. The scanning apparatus of claim 11, wherein the controller is to automatically without a user input instruct the scanner to delete the information of the mobile apparatus from the stored information regarding each of the plurality of devices, if the controller detects that a predefined period of time has passed since a last-received transmission from the mobile apparatus.

13. The scanning apparatus of claim 11, wherein
the information regarding each of the plurality of devices included in the list of the plurality of devices identifies each device included in the list of the plurality of devices, and the information regarding each of the plurality of devices included in the list of the plurality of devices other than the mobile apparatus comprises an IP address and/or port information.

14. The scanning apparatus of claim 11, wherein the list of the plurality of devices enables selection of at least one of a scanning apparatus and another mobile apparatus that support the scan-to-mobile function.

* * * * *